United States Patent [19]

Tsukada et al.

[11] Patent Number: 5,379,166
[45] Date of Patent: Jan. 3, 1995

[54] MAGNETIC DISK DRIVE DEVICE

[75] Inventors: Mitsuyoshi Tsukada; Masahiro Yuasa, both of Tokyo, Japan

[73] Assignee: Oki Electric Industry Co., Ltd., Tokyo, Japan

[21] Appl. No.: 788,460

[22] Filed: Nov. 6, 1991

[30] Foreign Application Priority Data

| Nov. 15, 1990 [JP] | Japan | 2-307254 |
| May 28, 1991 [JP] | Japan | 3-123754 |
| Oct. 4, 1991 [JP] | Japan | 3-257956 |

[51] Int. Cl.[6] .................... G11B 5/596; G11B 15/46
[52] U.S. Cl. ................... 360/78.14; 360/75; 360/73.03
[58] Field of Search ............. 360/78.14, 75, 103, 360/73.03, 71, 57, 77.08

[56] References Cited

U.S. PATENT DOCUMENTS

| 4,530,020 | 7/1985 | Sutton | 360/77.08 |
| 4,896,240 | 1/1990 | Moriya et al. | 360/77.08 |
| 4,984,100 | 1/1991 | Takayama et al. | 360/78.14 |
| 5,036,508 | 7/1991 | Okano | 360/73.03 |
| 5,144,504 | 9/1992 | Kitazawa | 360/75 |

*Primary Examiner*—Aristotelis Psitos
*Assistant Examiner*—Varsha A. Kapadia
*Attorney, Agent, or Firm*—Spencer, Frank & Schneider

[57] ABSTRACT

In a magnetic disk drive device comprises a magnetic disk having a plurality of concentric tracks on a data surface on which data are recorded. At least one of the tracks serves as a shipping area. Dedicated data is written in each of the data sectors in the shipping area and a DC erase section is formed in one of the data sectors in the shipping area. The dedicated data and the DC erase section are detected at the time of starting the rotation of the magnetic disk, and the speed of the disk is measured on the basis of the data thus obtained. The speed as obtained from the above data is monitored to determined when it has reached a predetermined value.

19 Claims, 15 Drawing Sheets

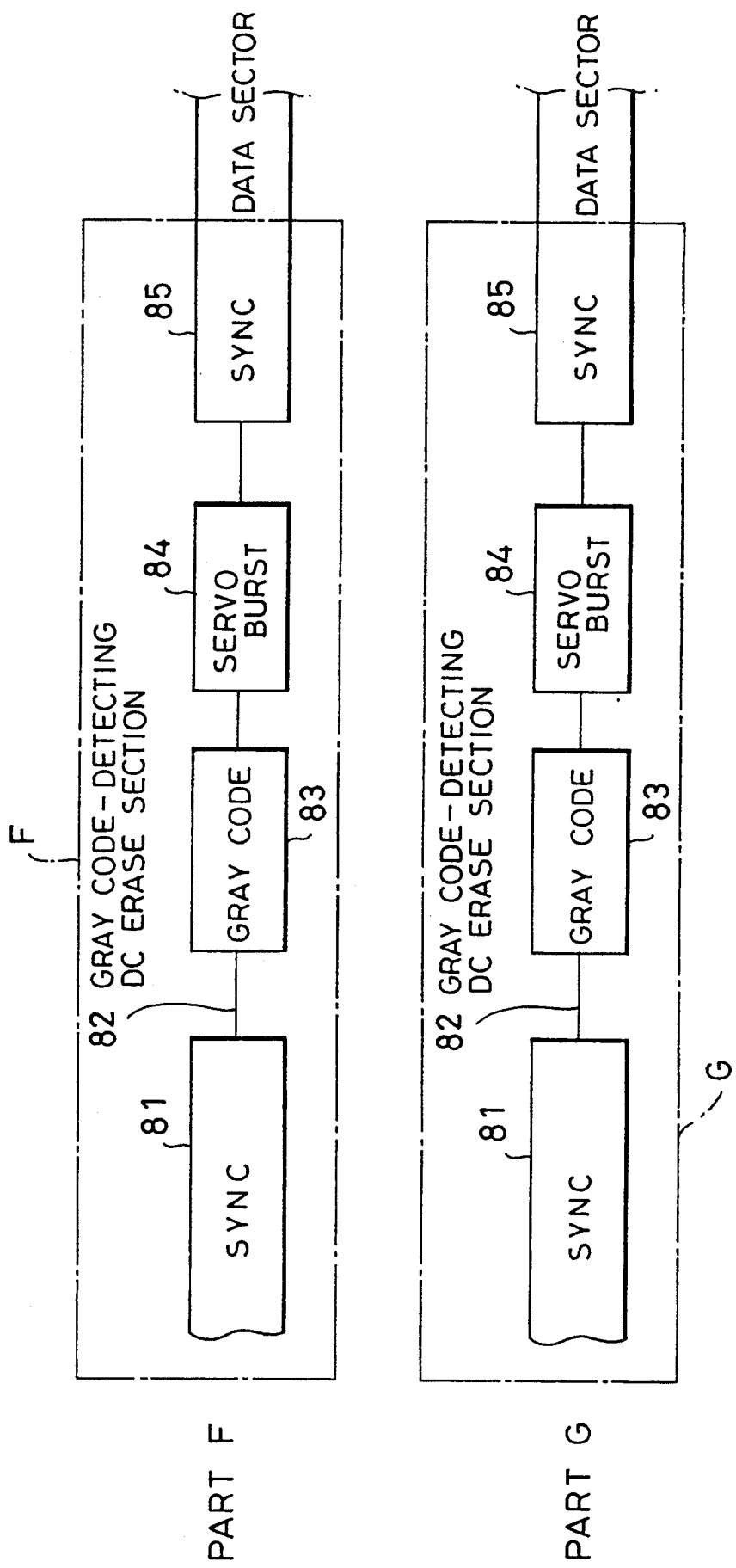

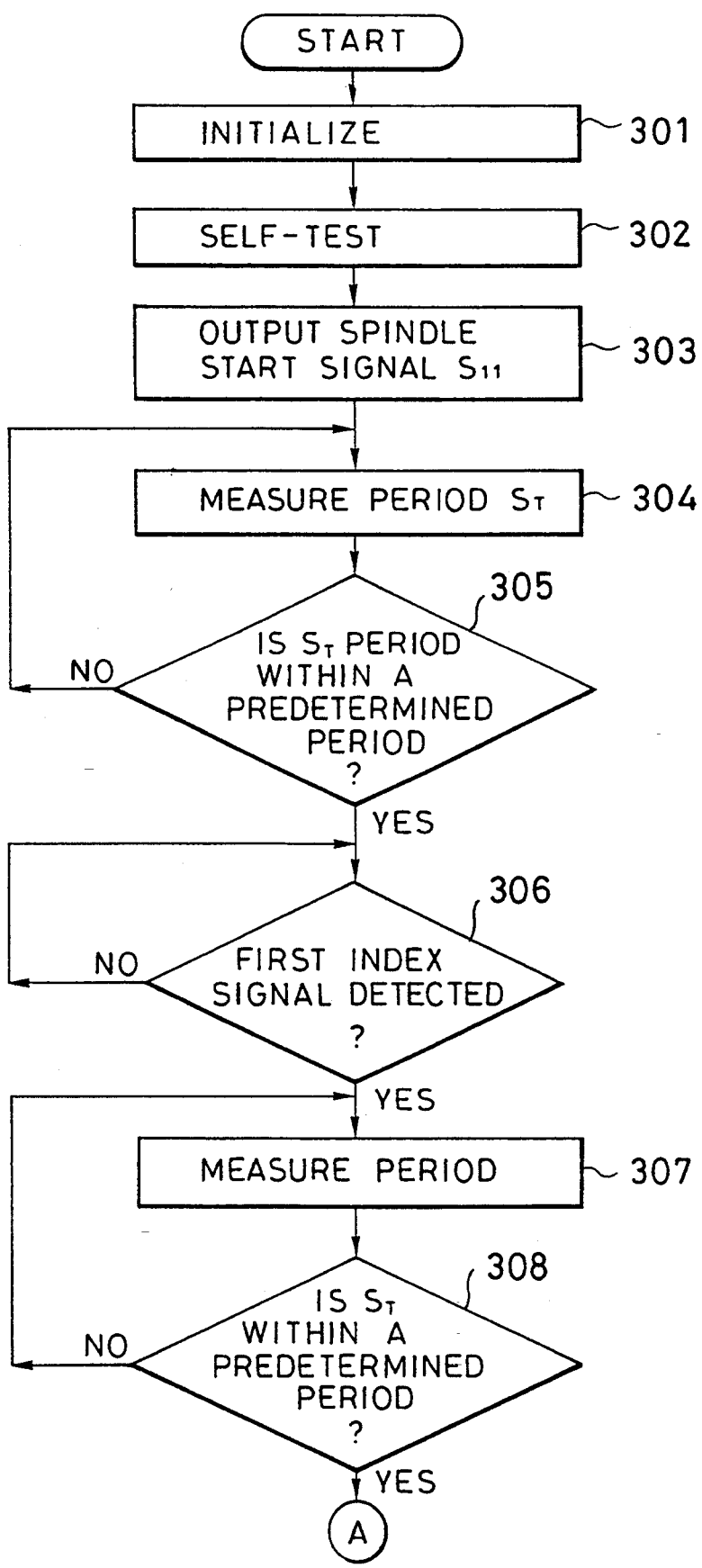

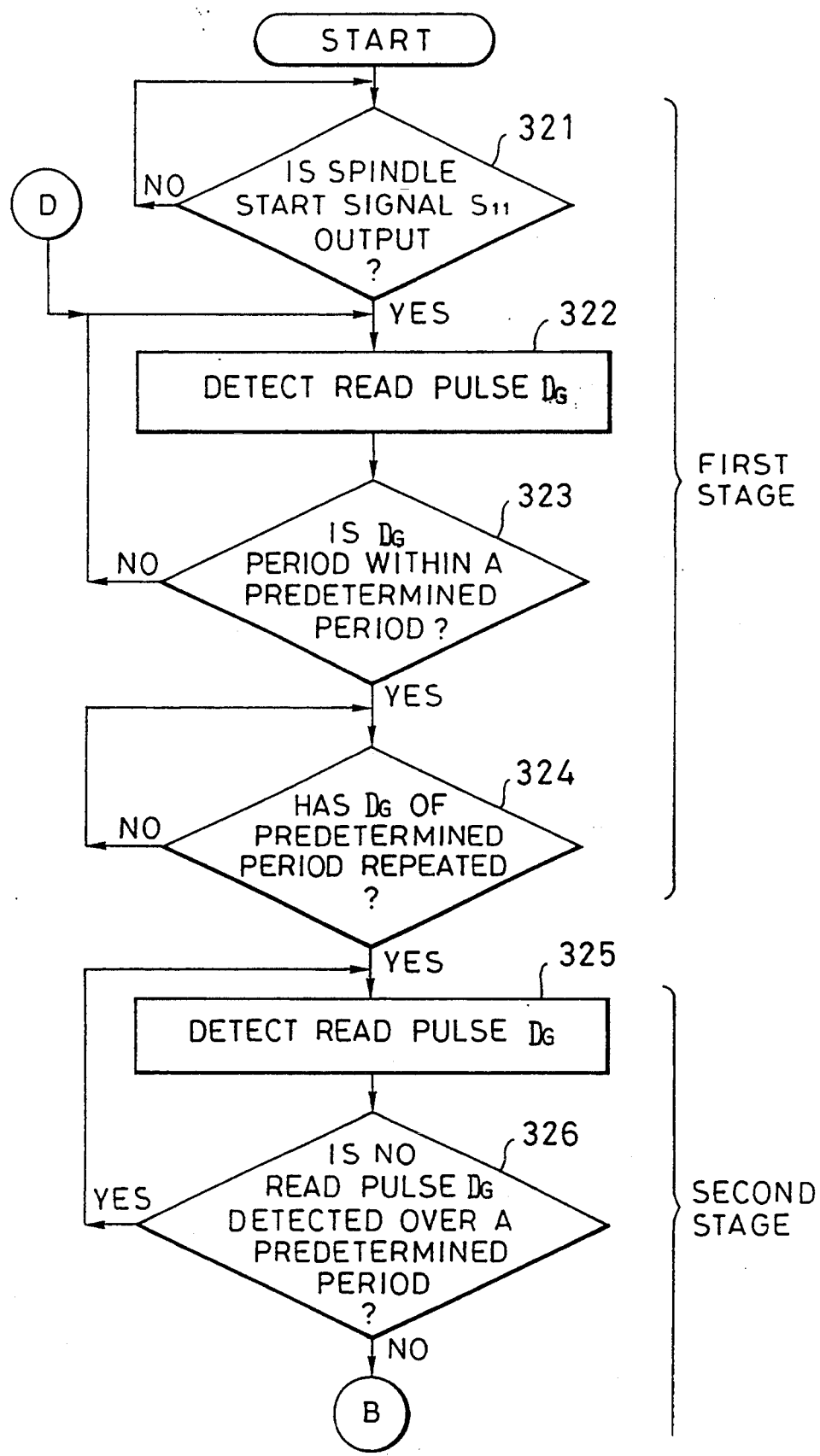

MAGNETIC DISK DRIVE DEVICE

BACKGROUND OF THE INVENTION

Field of the Invention

The present invention relates to a magnetic disk drive device, and in particular to control at the time of starting the magnetic disk drive device. More specifically, the invention relates to control of a magnetic disk drive device until the magnetic disk reaches a predetermined speed (until the magnetic disk reaches a rotation-ready state), and control for positioning the magnetic head onto a track constituting an initial position (when the magnetic disk drive device is in the drive-ready state) after the magnetic disk reaches the predetermined speed.

Prior Art

In a magnetic disk drive device of a dedicated servo-method, dedicated servo information required for positioning a magnetic head is written on one surface of a magnetic disk and the servo information is read by a dedicated magnetic head and the servo information read by the magnetic head is used for the positioning of the magnetic head. Data is written in and read from other surfaces by other magnetic heads aligned with the above-mentioned magnetic head for reading the servo information. The magnetic disk drive device of the dedicated servo method has an advantage in that the identification of the track is easy since the servo information can be obtained at all times. A problem associated with this method is that one entire surface of a disk is dedicated for the servo information. This reduces the number of data surfaces which can be used for data recording. This problem is more acute as the number of disks is reduced.

To eliminate this problem, use is made of a magnetic disk drive device of a sector servo (embedded servo) system in which information for positioning is also written on the same surface of the magnetic disk on which data are also written.

There is however increasing demand for further reduction in cost and size of the device and further improvement in the high-speed access. For instance, a Hall-IC (an integrated circuit containing a Hall-element) for producing an index signal which is a one-revolution signal (a signal produced once per revolution) was often built in a spindle motor which rotates the magnetic disk. But recently the trend is to eliminate the Hall-IC to reduce the cost and produce an index signal on the basis of information obtained by reading the disk.

In addition, an access motor for positioning the magnetic heads was provided with a position detector for high-speed access, and a glass slit disk, a light-emitting diode, a photo-transistor, and the like were required for forming an optical encoder of the position detector. The recent trend is again to eliminate these components to reduce the size and to improve the high-access performance, and instead to provide head positioning information written on the magnetic disk in advance, read the positioning information by means of a magnetic head and use it at a control unit for the calculation required for position control.

Thus, the recent magnetic disk drive device has hardware and software configurations different from those of the prior art devices, and various methods of control have been proposed.

SUMMARY OF THE INVENTION

The present invention provides an improvement in the control of a magnetic disk drive device at the time of start-up.

An object of the invention is to reduce the size and cost of the magnetic disk drive device.

Another object of the invention is to increase the access speed of the magnetic disk drive device.

A magnetic disk drive device according to a first aspect of the invention comprises:

a magnetic disk having a plurality of concentric tracks on a data surface on which data are recorded, with the tracks being divided by a plurality of boundary lines extending radially from the center of the data surface, into a plurality of data sectors and a plurality of servo sectors;

a spindle motor for rotating the magnetic disk;

a magnetic head for reading data from and writing data in said magnetic disk as the disk is rotated by said spindle motor;

wherein at least one of the tracks is made to serve as a shipping area;

dedicated data which is different from data in the data sectors is written in each of the data sectors in the shipping area;

a DC erase section is formed in one of the data sectors in the shipping area; and said magnetic disk drive device further comprises a control unit for detecting the dedicated data and the DC erase section at the time of the start of the magnetic disk, and measures the speed of the disk on the basis of the data thus obtained, and detects the fact that the speed has reached a predetermined value.

A magnetic disk drive device according a second aspect of the invention comprises:

a magnetic disk having servo sectors containing servo information and data sectors containing data which are disposed alternately in the circumferential direction, and a shipping area, in which dedicated data is written in advance at portions corresponding to the data sectors, and DC erase section disposed at a portion corresponding to the data sector for generating a first index signal;

a control means for controlling start of the spindle motor and performing constant-speed control over the magnetic disk;

a magnetic head for reading the dedicated data and data on the magnetic disk; and a servo timing circuit for confirming that the magnetic disk is in the constant speed rotation on the basis of the dedicated data read by the magnetic head, and sending a first index signal to the control means;

wherein said control means sends, after receiving the first index signal, a magnetic disk, rotation-ready signal to said servo timing circuit and sets the first data sector detected first after passage of the DC erase section, as a first data sector; and said servo timing circuit sends the sector signal generated first after receiving the rotation-ready signal on the basis of the servo information read by the magnetic head, as a second index signal to the control means, and masks the portion within in the shipping area corresponding to the data sector.

BRIEF DESCRIPTION OF THE DRAWINGS

FIG. 5 is an explanatory diagram of parts F and G in the servo sector 8 shown in FIG. 4.

FIG. 10A and FIG. 10B are flowcharts showing the control operation of the control unit at the time of starting the spindle motor.

FIG. 11A to FIG. 11E are flow charts showing the control operation of the servo timing circuit 11.

DETAILED DESCRIPTION OF THE PREFERRED EMBODIMENTS

A first embodiment of the invention will now be described with reference to FIG. 1 to FIG. 8.

Figure 1:
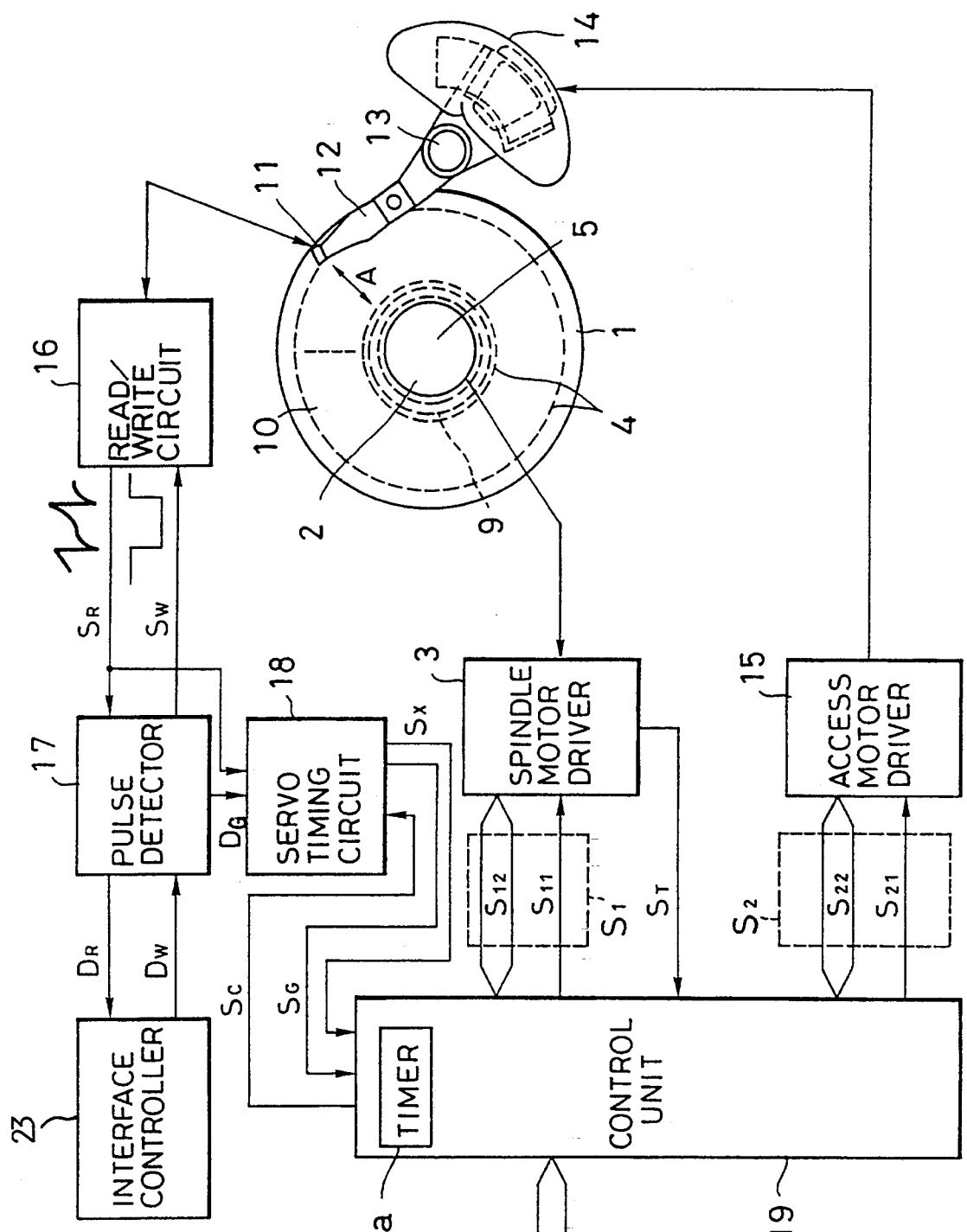
FIG. 1 is a block diagram showing a magnetic disk drive device of an embodiment of the invention.

As illustrated in FIG. 1, a magnetic disk drive device of this embodiment comprises a magnetic disk 1, a spindle motor 2 for rotating the magnetic disk 1, and a spindle motor driver 3 for driving the spindle motor 2 at a constant speed.

The magnetic disk 1 has data surfaces on its both sides. Although the magnetic disk drive device of the illustrated embodiment comprises a single magnetic disk, it may alternatively comprise more than one magnetic disk. In such a case, the magnetic disks are coaxially disposed and are supported to rotate together about a common axis, being spaced from each other to permit insertion of magnetic heads between adjacent disks.

Figure 2:
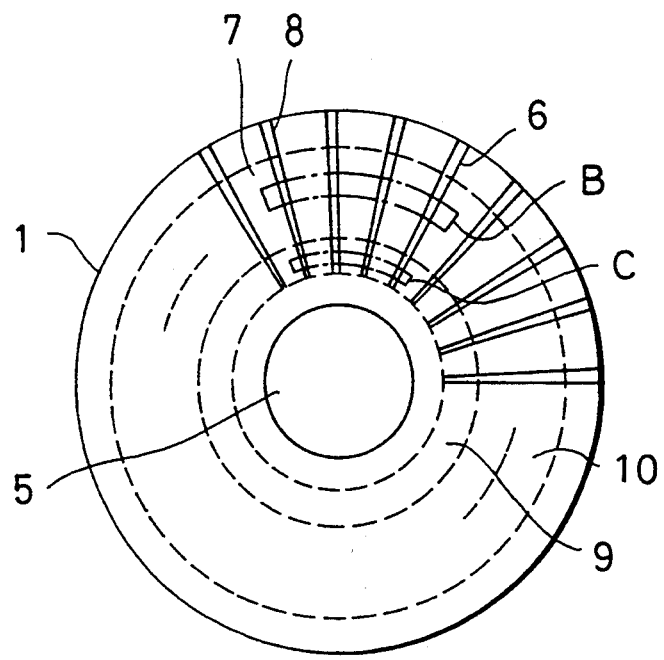
FIG. 2 is a schematic diagram showing the recording format of a surface of the magnetic disk.

A plurality of concentric tracks 4 are provided on each of the data surfaces of the disk 1. As illustrated in FIG. 2, each of the data surfaces is divided by a plurality of straight boundary lines 6 extending radially from the center 5 of the data surface into a plurality of data sectors 7 and a plurality of servo sectors 8 between adjacent data sectors 7. Data and servo information are written on each of the data surfaces along concentric tracks.

A shipping area 9 is formed at the innermost part of the data surface. As an alternative, the shipping area 9 may be formed at the outermost part of the data surface, or may be formed both at the innermost part and the outermost part of the data surface.

As will be more apparent from the subsequent description, the magnetic head 11 stays in the shipping area 9 after the power supply to the magnetic disk drive device is turned on and until the magnetic disk 1 reaches a predetermined speed (until the magnetic disk is brought to the rotation-ready state). Area 10 other than the shipping area 9 is the data area.

The magnetic disk drive device of the illustrated embodiment further comprises magnetic heads (only one being shown) each provided to read data from and write data in one of the upper and lower surfaces of the magnetic disks 1, a swing arm 12 for supporting the magnetic heads 11 in such a way that the magnetic heads can move ill the radial direction A of the disk 1, an access motor 14 for rotating the swing arm 12 about a pivotal axis 13, and an access motor driver 15 for driving the access motor 14.

The magnetic disk drive device of the illustrated embodiment further comprises a read/write circuit 16 for amplifying analog data read by each of the magnetic heads from the magnetic disk 1 and supplying electric currents to the magnetic heads in accordance with the write data, and a pulse detector 17 for converting the amplified analog signal $S_R$ into read pulses $D_G$ and also into a pulsative signal $D_R$ in the form of a 2-7 RLL (run-length limited) code to an interface controller 23, and a servo-timing circuit 18 for sampling the read pulse $D_G$ in accordance with the command signal $S_C$ from the control unit 19, and generating read pulses $S_G$ corresponding to read pulses $D_G$, and a timing signal $S_X$.

The control unit 19 is comprised, for example, of a programmed one-chip microcomputer. The control unit 19 controls operation of the entire magnetic disk drive device.

The control unit 19 supplies the spindle motor driver 3 with a spindle control signal $S_1$ for commanding start and stop of the driving operation of the spindle motor 2, and supplies the access motor driver 15 with an access control signal $S_2$ for commanding start and stop of the driving operation of the access motor 14.

The spindle control signal $S_1$ comprises a spindle enable signal $S_{11}$ for enabling or disabling the spindle motor driver 3, and a command signal $S_{12}$ for commanding commutation of the spindle motor 2. The signal $S_T$ is formed in the spindle motor driver 3, for example, from exciting voltages of various exciting windings and back electromotive force with reference to all end of each winding in the spindle motor 2.

As will be more apparent from the following description, the spindle motor driver 3 performs control over the spindle motor 2 responsive to an index signal which is a one-revolution signal (a signal produced once per revolution) so that the spindle motor 2 rotates at a constant speed.

The access control signal $S_2$ comprise an access motor enable signal $S_{21}$ for enabling or disabling the access motor driver 15, and a command signal $S_{22}$ for commanding rotation of the access motor 14.

A command signal $S_C$ is supplied from the control unit 19 to the servo timing circuit 18. The pulsative signal $D_R$ is supplied from the pulse detector 17 to the interface controller 23 when the magnetic head 11 reads data from the data area 10. The pulse detector 17 receives write data $D_W$ from the interface controller 23 and supplies write data $S_W$ via the read/write circuit 16 to the magnetic head 11, which writes data on the magnetic disk 1 responsive to the write data $S_W$.

Figure 3:
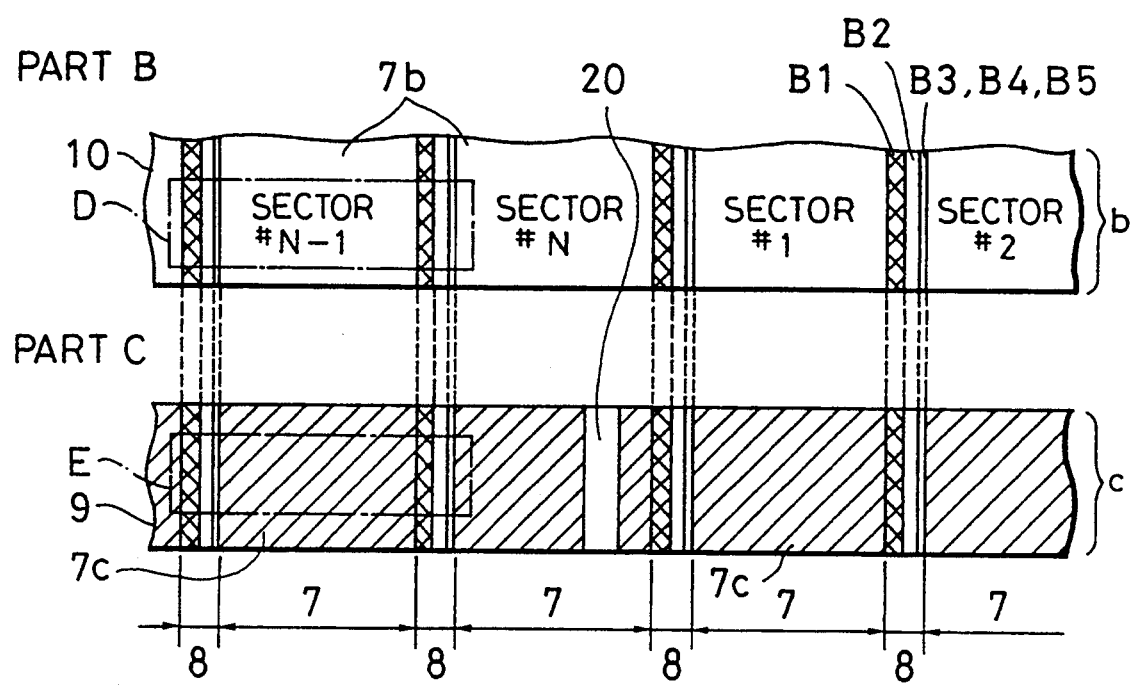
FIG. 3 is an enlarged diagram showing the recording format of part B in the data area 10 and part C in the shipping area 9.

Part B of the data area 10 and part C of the shipping area 9 are shown, in an enlarged scale, in FIG. 3. The dotted lines connecting parts B and C indicate angular correspondence between the parts in the data area and the parts in the shipping area: the parts connected by the dotted lines with each other are at the same angular position of the disk. As illustrated in FIG. 3, part B of the data area 10 is comprised of data sector 7 and servo sector 8. Part C of the shipping area 9 is comprised of data sector 7 and servo sector 8. In the following explanation, the data sectors within the data area 10 are denoted by 7b, and the data sector within the shipping area 9 are dedicated data areas denoted by 7c and are also called dedicated data areas. In the present embodiment, a DC erase section 20 for indexing is formed in one of the dedicated data areas 7c in the shipping area 9. The DC erase section 20 is an area where no data (A.C. signal component) is written, so that when the DC erase section 20 is read or scanned by the magnetic head, the output of the magnetic head does not contain any A.C. component. The DC erase section 20 is at a position in the dedicated data area 7c corresponding in angular position to the data sector 7b in the data area 10.

Figure 4:
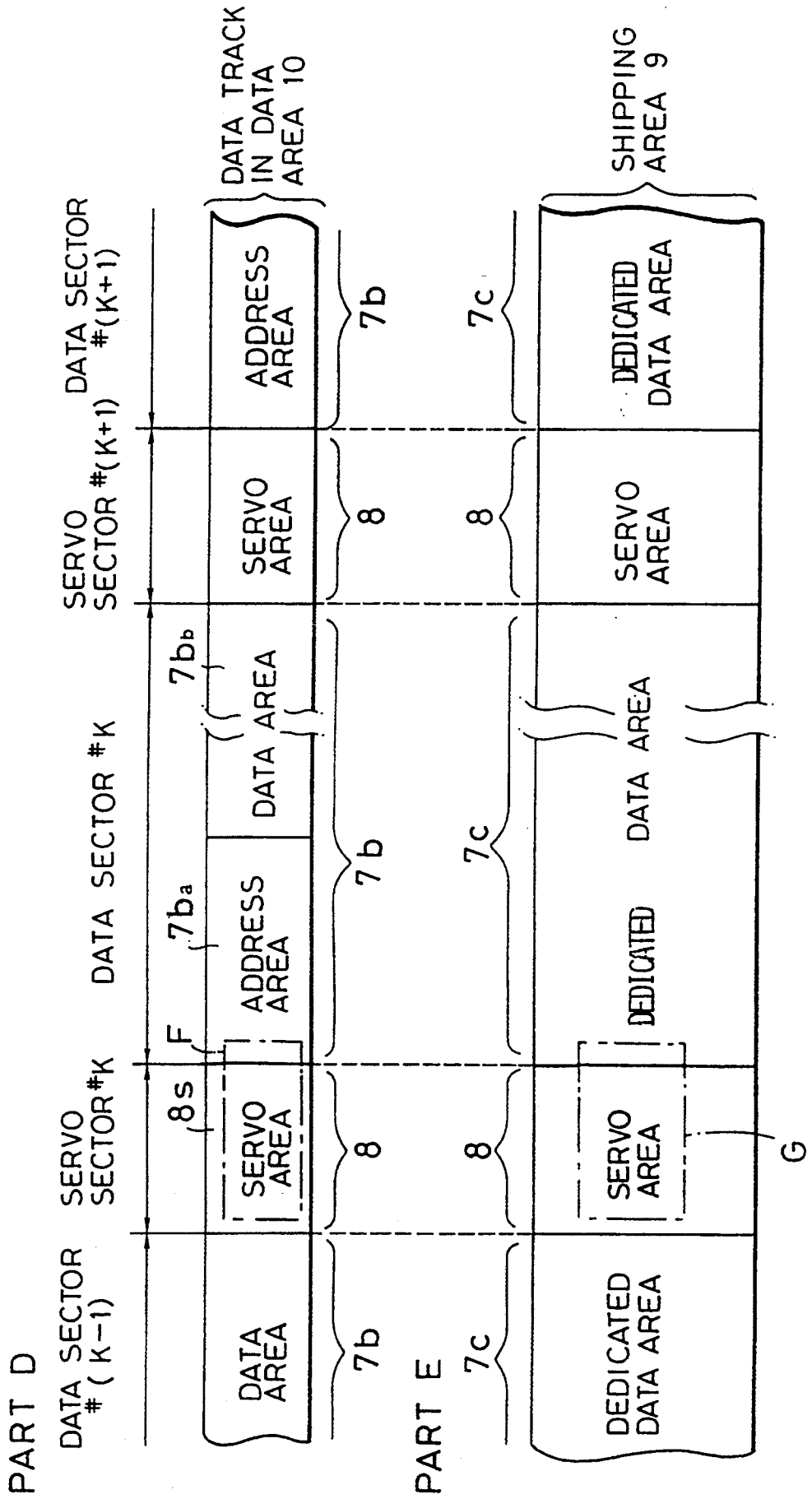
FIG. 4 is an enlarged diagram of parts D and E in FIG. 3.

FIG. 4 shows a recording format showing part of one of a plurality of data tracks and part of the shipping area corresponding in angular position to the above-mentioned part of the data track.

As illustrated in FIG. 4, the data sector 7b in the data area 10 is divided into an address area 7ba and a data area 7bb. Identification information, such as the cylinder number, which is written at the beginning of the part of a track in the data sector 7b is written into the address area 7ba. The dedicated data area 7c contains data (called dedicated data) different from data on other tracks, i.e., data sector 7b in the data area 10. The dedicated data is of a constant frequency. The dedicated data is written in the shipping area 9 at a portion 7c corresponding in angular position to the data sector 7b in the data area.

As illustrated in FIG. 5, the servo sector 8 comprises a sync area 81, a gray code-detecting DC erase section 82, a gray code 83, a servo burst data 84, and a sync area 85. Written in the sync area 81 is a dedicated data of constant frequency. No data (A.C. signal component) is written in the gray code-detecting DC erase section 82. The gray code 83 is track identification information. The servo burst data 84 is data indicating the deviation of the head from the track center and used for correcting errors in position (i.e., for settling) of the magnetic head 11.

Figure 6A:
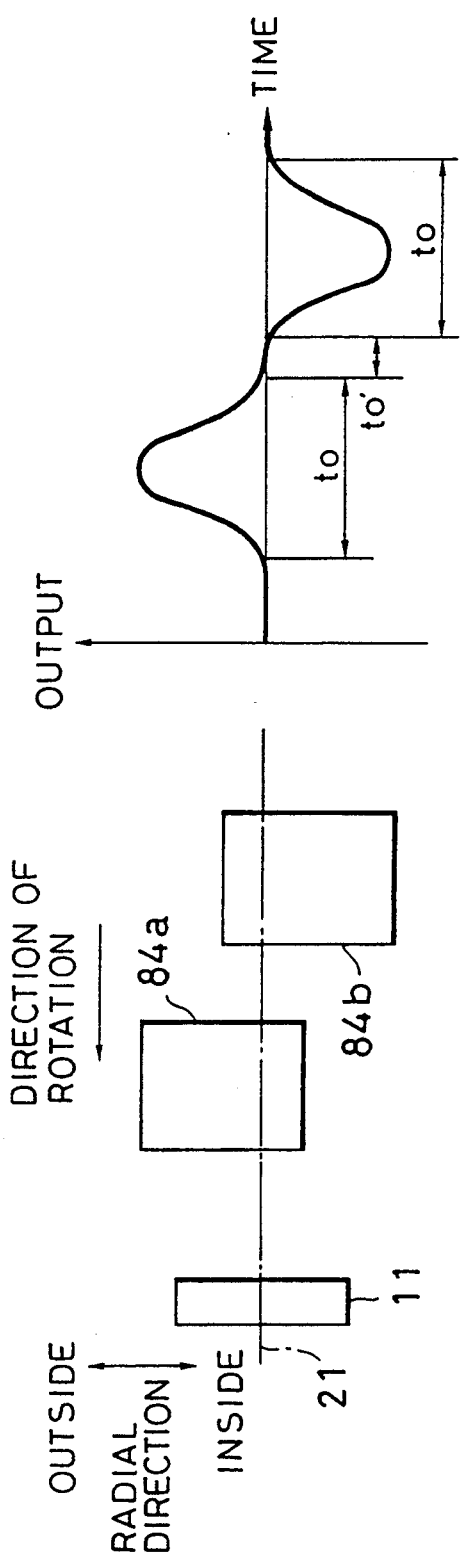
FIG. 6A and FIG. 6B are explanatory diagrams of the servo burst data 84.
Figure 6B:
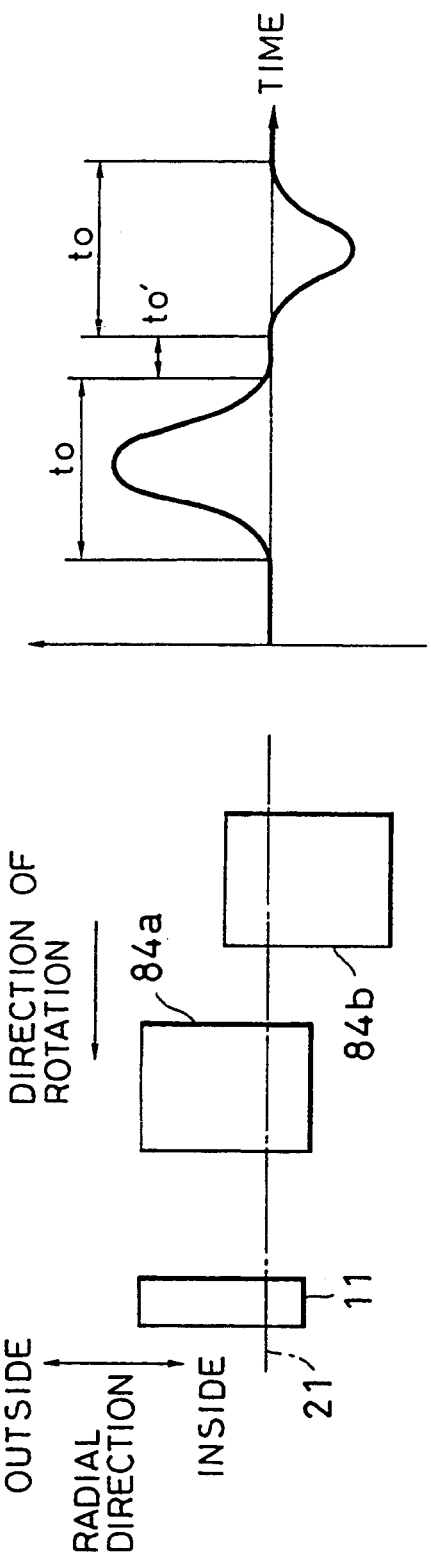

As illustrated in FIG. 6A and FIG. 6B, the servo burst data 84 comprises data 84a written on the radially outer side of the track center position 21 at a predetermined distance, and data written on the radially inner side of the track center position 21 at a predetermined distance. The servo burst signal obtained by reading the servo burst data 84 is as shown in the right side of FIG. 6A and FIG. 6B. When the magnetic head 11 is at the track center 21 as shown in FIG. 6A, the outputs due to the servo burst data 84a and 84b are of the same magnitude. When the magnetic head 11 is shifted radially outward as shown in FIG. 6B, the output due to the servo burst data 84a is larger than the output due to the servo burst data 84b. When the magnetic head 11 is shifted radially inward, the output due to the servo burst data 84b is larger than the output due to the servo burst data 84a. By adjusting the position of the magnetic head such that the magnitudes of the servo burst signals are identical, the magnetic head 11 is positioned at the track center 21. The control unit 19 receives the servo burst information from the servo timing circuit 18 and calculates, on the basis of the servo burst information, the position of the head 11 and supplies the access motor driver 15 with the result of the calculation as a signal $S_{22}$ indicating the rotation command for the access motor 14.

The operation of the device will now be described.

Figure 7:
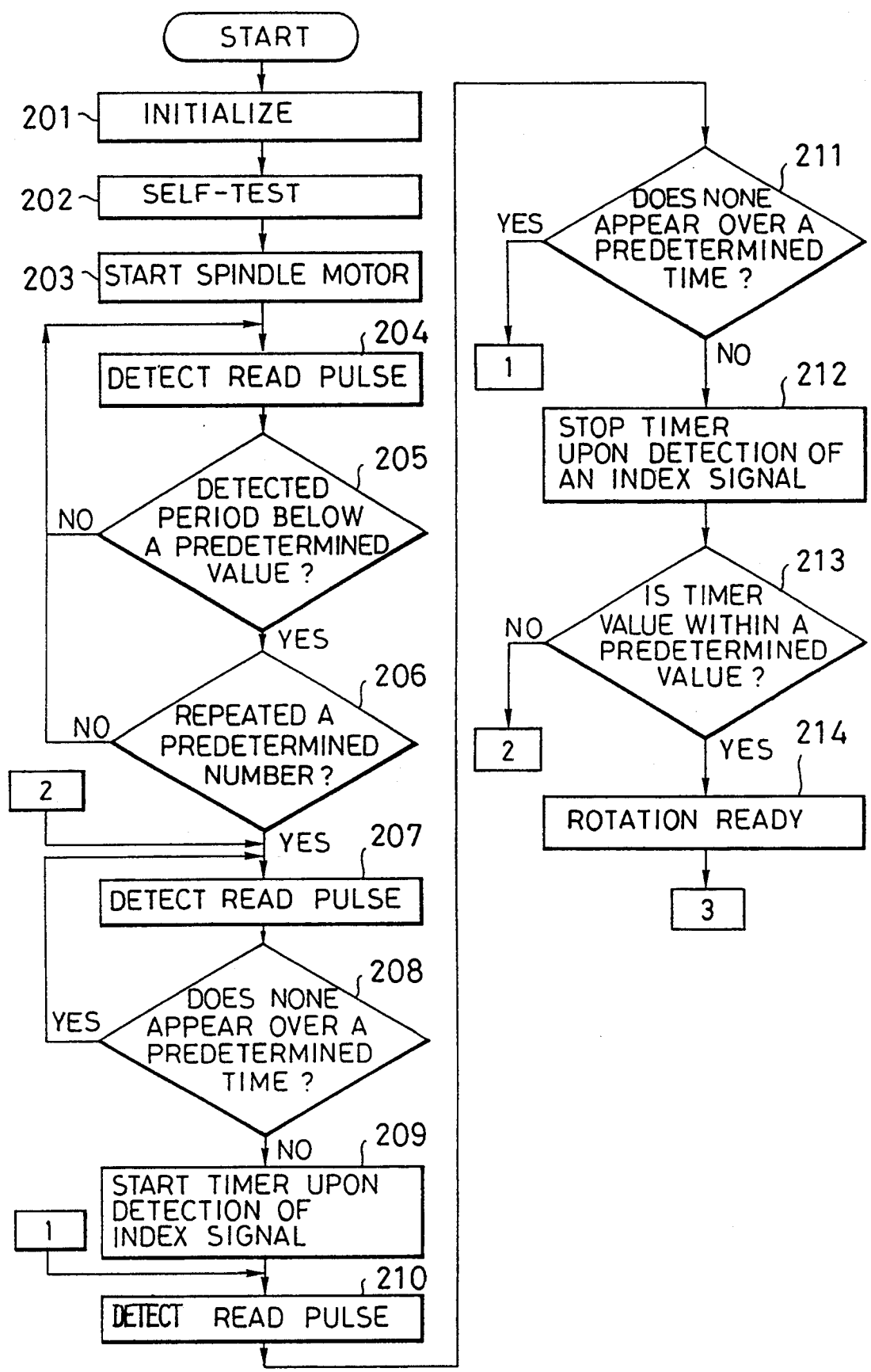
FIG. 7 is a flow chart showing the operation from the power on of the magnetic disk drive device until the rotation-ready state is reached.

First, the operation of the magnetic disk drive device from the power on of the magnetic disk drive device until the rotation-ready state is reached is explained with reference to FIG. 7 as well as FIG. 1 to FIG. 4.

When the power to the magnetic disk drive device is turned on, the control unit 19 performs the port set, system register set, and other initialization operations (201), and executes checking of a ROM and a RAM within the control unit 19, and other self-testing (202).

The control unit 19 then outputs the spindle start signal $S_{11}$ to the spindle motor driver 3 to start the spindle motor 2 (203). When the spindle motor 2 is started, the spindle motor 2 and the disk 1 fixed thereto start rotating (203), and their rotational speed gradually increases.

When the magnetic disk drive device is not operation, the magnetic head 11 is in the shipping area, so at the time of start-up of the device, the magnetic head is at the shipping area, and is in contact with the disk being slidable in the circumferential direction. With the increase of the rotational speed of the disk, the magnetic head 11 floats from the disk 1.

In the present invention, before the disk 1 reaches a predetermined speed, the magnetic head 11 begins reading data from the dedicated data area 7c in the shipping area 9 on the disk. The dedicated data is written with a constant frequency, so whether or not the disk 1 has reached the predetermined value can be determined by monitoring the period of the read pulse $D_G$ that is obtained by processing the dedicated data at the servo timing circuit 18.

The dedicated data in the dedicated data area 7c in shipping area 9 is read by the magnetic head 11, amplified by the read/write circuit 16, converted into pulsative signals at the pulse detector 17, and sent to the servo timing circuit 18, where only such information that required is sampled and supplied as read pulse $S_G$ to the control unit 19 (204).

As the speed of the spindle motor 2 increases, the period of the read pulses $S_G$ that are thus sampled and time-measured at the control unit 19 becomes shorter. The control unit 19 makes a judgment on whether or not the period at which the read pulses $S_G$ are detected (the interval between one read pulse and the preceding pulse) has become shorter than a predetermined time (205), and when the read pulses $S_G$ having a period (interval between it and the preceding pulse) shorter than the predetermined time appear consecutively not less than a predetermined number (206) it is then judged that the spindle motor 2 is now in vicinity of the predetermined speed.

Then, the control unit 19 searches for a DC erase section required for generating an index signal. The control unit 19 can ascertain that the magnetic head still in the shipping area 9 by detecting the DC erase section 20, from which no signal at all appears for a predetermined time, once every revolution, within a signal written with the predetermined frequency and in a predetermined pattern.

To look for the indexing DC erase section 20 in the shipping area 9, the read pulses $S_G$ are detected (207). If the state in which no output at all is detected for a predetermined time while the read pulses $S_G$ are detected with a predetermined period (208), the servo timing circuit 18 outputs an index signal $S_X$.

Upon receipt of the index signal $S_X$, the control unit 19 starts the timer 19a (209) and outputs the signal $S_C$ thereby to mask the servo timing circuit 18. The output of the signal $S_C$ is continued until the predetermined time is measured by the timer 19a. That is, until the magnetic head 11 enters the dedicated data area 7c containing the indexing DC erase section 20, the servo timing circuit 18 is kept masked, and when the magnetic head 11 enters the dedicated data area 7c containing the DC erase section 20, the mask is turned off. After the mask is turned off, the read pulses $S_G$ are again sampled (210). The reason why the servo timing circuit 18 is masked for a predetermined time is to prevent detection of the gray code-detecting DC erase section (82 in FIG. 5) thereby preventing confusion with the indexing DC erase section (20 in FIG. 3).

If the state in which no output is detected while the read pulses $S_G$ are detected with the predetermined period continues (211) after the mask is turned off, the servo timing circuit 18 outputs the index signal $S_X$, and the timer 19a in the control unit 19 is stopped (212). If the index signal $S_X$ is not detected, an error indication is made.

The control unit 19 then Judges whether the value of the timer 19a is within a predetermined range, and If it is within the predetermined range (213), it is recognized that the rotation-ready state in which the disk 1 is at the predetermined speed has been attained (214).

The operation described so far is the operation up to the rotation-ready state. As has been described, in the present embodiment, the dedicated data of the constant frequency is written in the dedicated data area 7c in the shipping area 9, and a DC erase section 20 in which no data is written is formed in one of the dedicated data areas 7c. At the time of the start of the rotation of the disk 1, the dedicated data and the DC erase section 20 are detected, and the data obtained therefrom are used for measuring the speed of the disk 1, and recognition that the rotation-ready state has been reached is made. Use of the Hall-IC, for example, to detect the speed of the spindle motor can therefore be eliminated. The overall size and cost of the device are therefore reduced.

In the above embodiment, it is detected on the basis of the data obtained by reading the dedicated data in the dedicated data area 7c in the shipping area 9 that the spindle motor 2 has reached a speed near the predetermined speed, and it is then recognized that the predetermined speed has been reached by detecting the DC erase section 20. The reason for adopting the above procedure is as follows. That is, the speed of the spindle motor 2 is not stable immediately after the start of the spindle motor 2, and it is advantageous to use data which is derived at a shorter interval, i.e., the dedicated data rather than the index signal obtained from the DC erase section 20. After the rotation becomes near the predetermined speed and stable, is advantageous to use a signal which appears every revolution, i.e., the index signal $S_X$ obtained from the DC erase section 20.

Figure 8:
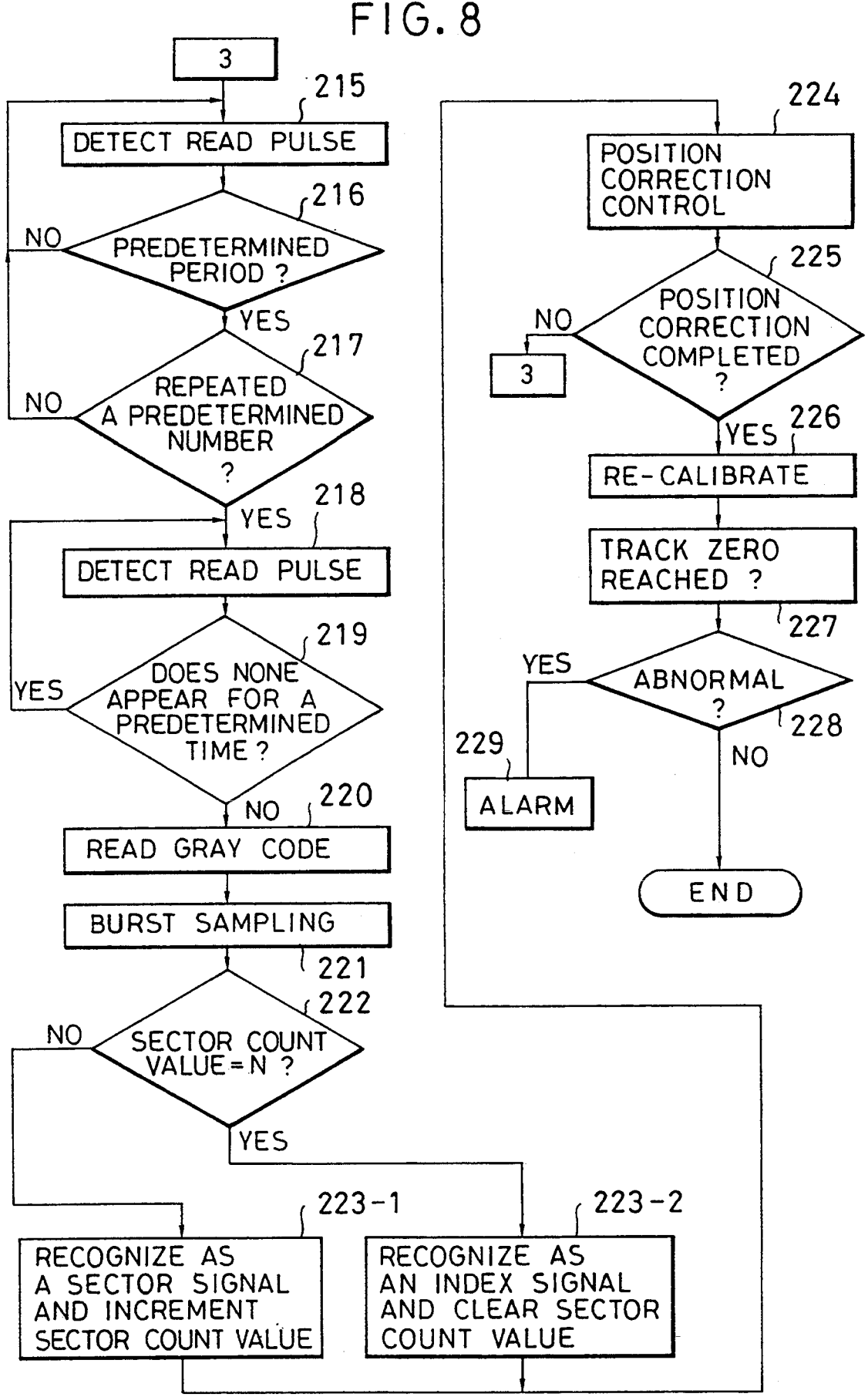
FIG. 8 is a flow chart showing the operation from the rotation-ready until the drive-ready.
Figure 9:
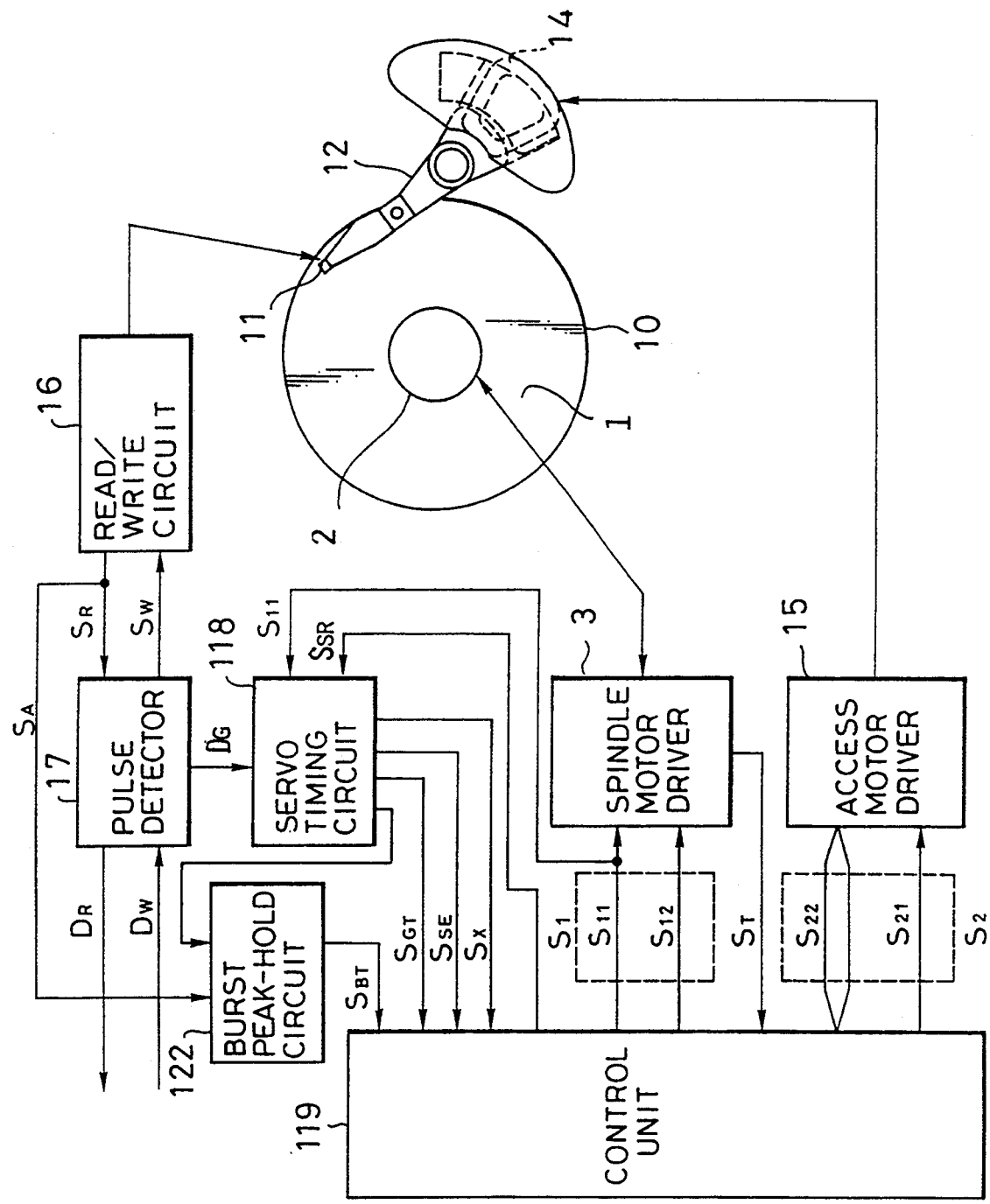
FIG. 9 shows a second embodiment of the invention.

The operation from the rotation ready to the drive ready will now be described with reference to FIG. 8 as well as FIG. 1 to FIG. 6A and FIG. 6B.

First, the magnetic head 11 leaves the indexing DC erase section 20 and enters the sync area 81 in the servo sector 8. The sync area 81 is formed of data written with the constant frequency, so when the disk 1 is rotating at the predetermined speed, the period of the read pulses $S_G$ read by the magnetic head 11 is of the predetermined value (215). If the read pulses of the predetermined period are consecutively detected for a predetermined time (216 and 217), the control unit 19 then looks for a gray code-detecting DC erase section 82 by detecting the read pulse $S_G$. If the state in which no output is detected for a predetermined time while the read pulses $S_G$ are detected with the predetermined period, it is recognized that the gray code-detecting DC erase section 82 (219) has been detected, and preparation for reading the gray code 83 is commenced. The data which appears next to the DC erase section 82 is treated as the gray code 83 (220). By this reading, the track which the magnetic head 11 is following is known.

The multiple-phase servo burst data 84 is next read, and is sampled, and the magnetic head 11 is accurately positioned on the basis of the sampled servo burst data (221).

The magnetic head 11 then leaves the servo burst data and enters the sync area 85 in the data sector 7c.

The magnetic head 11 then performs the confirmation of the sector count value (as illustrated in FIG. 3, the sector immediately following the DC erase section 20 is named the first sector (sector #1) and the last sector is named the N-th sector (sector #N)), and if the sector count value is not the predetermined value N, the sampling signal $S_X$ generated from the servo timing circuit 18 is recognized, as the sector signal, and the sector count value is incremented (223-1). When the sector count value is the predetermined value N, then the signal $S_X$ is recognized as the index signal, and the sector count value is cleared (223-2). The index signal is used for control of the speed of the spindle motor 2 and for other purposes. The sector signal is used for identifying the sector.

By means of the signal $S_C$ transmitted from the control unit 19 to the sampling circuit 18, the servo timing circuit 18 is masked until the next servo sector 8 is read. Simultaneously with the masking, the timer 19a is started. The masking will prevent detection of the DC erase section and the dedicated data in the data sector 7.

Subsequently, in the stage until the servo sector 8 is read, the control unit 19 reads the servo signal $S_G$ that has been sampled, and moves the magnetic head to the track center (224). The track position control of the magnetic head 11 is achieved by calculating the track position of the magnetic head 11 on the basis of the servo signal $S_G$ and supplying, on the basis of the calculated position, the access motor driver is with an access motor rotation command signal $S_{22}$. The track position control over the magnetic head 11 is normally conducted after the sector count value is incremented or cleared, and before the next sector servo section appears. If position correction is not completed within this period (225), the procedure is returned to step 115, and the operation up to the step 225 is repeated. That is, the track position control is conducted over a plurality of sectors.

When the magnetic head position correction is completed (225), the re-zero or re-calibration operation toward the reference position is conducted (226). The re-zero operation is to move the magnetic head 11 to the initial track or reference track position (track 0 position, e.g., the position of the outermost track). The re-zero operation is achieved by identifying the track on which the head is currently following on the basis of the gray code and supplying, on the basis of the calculated position, the access motor driver 15 with an access motor rotation command signal $S_{22}$.

After reaching the track zero (227) judgment is made as to whether there is any abnormality in the device. If no abnormality is found (228), it is recognized that the drive-ready state is reached and the device will then be in the state for waiting a command from a host device. If any abnormality is found, an error indication is made.

Described above is the operation after the rotation-ready state up to the drive-ready state. As has been described, positioning control over the head 11 is made on the basis of the dedicated data and the servo information which are written in advance or pre-recorded on the disk 11, so it Is not necessary to provide an optical encoder or other signal generating section on the access motor and associated circuit therefore. The cost of the device can therefore be lowered and the reliability is improved.

Moreover, in the present embodiment, the gray code 83 which is a track identification information is written in the servo sector 8, and by reading the gray code immediately after the gray code-detecting DC erase section 82, the track position of the magnetic head 11 is recognized and this information can be used for the re-zero operation.

As has been described, according to the first embodiment of the invention, at the time of starting the rotation of the magnetic disk, the dedicated data and the DC erase section are detected by the magnetic head, and on the basis of the data obtained thereby, the speed of the disk is measured, and the fact that the rotation ready state is reached is detected. It is therefore not necessary to measure the speed on the side of the spindle motor, and construction of the spindle motor is simplified, and the size is reduced and the cost is lowered.

In addition, the gray code immediately after the gray code-detecting DC erase section is read and used for identifying the track. It is therefore not necessary to mount components of an optical encoder or the like on a swing arm on which the magnetic head is also mounted. The inertia of the swing arm is therefore reduced, so that access speed is increased.

In addition, since the servo system is implemented by the control unit comprised of a programmed one-chip microcomputer, the amount of circuitry required is reduced and the circuit is simplified, and the reliability is improved.

A second embodiment of the invention will now be described with reference to FIG. 9, FIG. 10A and FIG. 10B, and FIG. 11A to FIG. 11E. The second embodiment differs from the first embodiment in that part of the functions performed by the control unit 19 in the first embodiment are now performed by the servo timing circuit 118 of the second embodiment. The second embodiment also differs from the first embodiment in the manner of control, as will be understood from the following description. A burst peak-hold circuit 122 is separately shown in FIG. 9, but tills is not a difference in substance. That is, the servo timing circuit of FIG. 1 also performs the functions of the peak-hold circuit 122 of FIG. 9. The configuration of the system is identical to that of the first embodiment, except as noted below.

The spindle motor driver 3 cooperates with the control unit 119 to control start of the spindle motor 2 on the basis of the rotor position signal;

The servo timing circuit 118 of this embodiment produces various timing signals $S_{GT}$, $S_{BT}$, $S_{SE}$ and $S_X$ and sends them to the control unit 119.

The recording format is identical with that of the first embodiment.

Figure 10B:
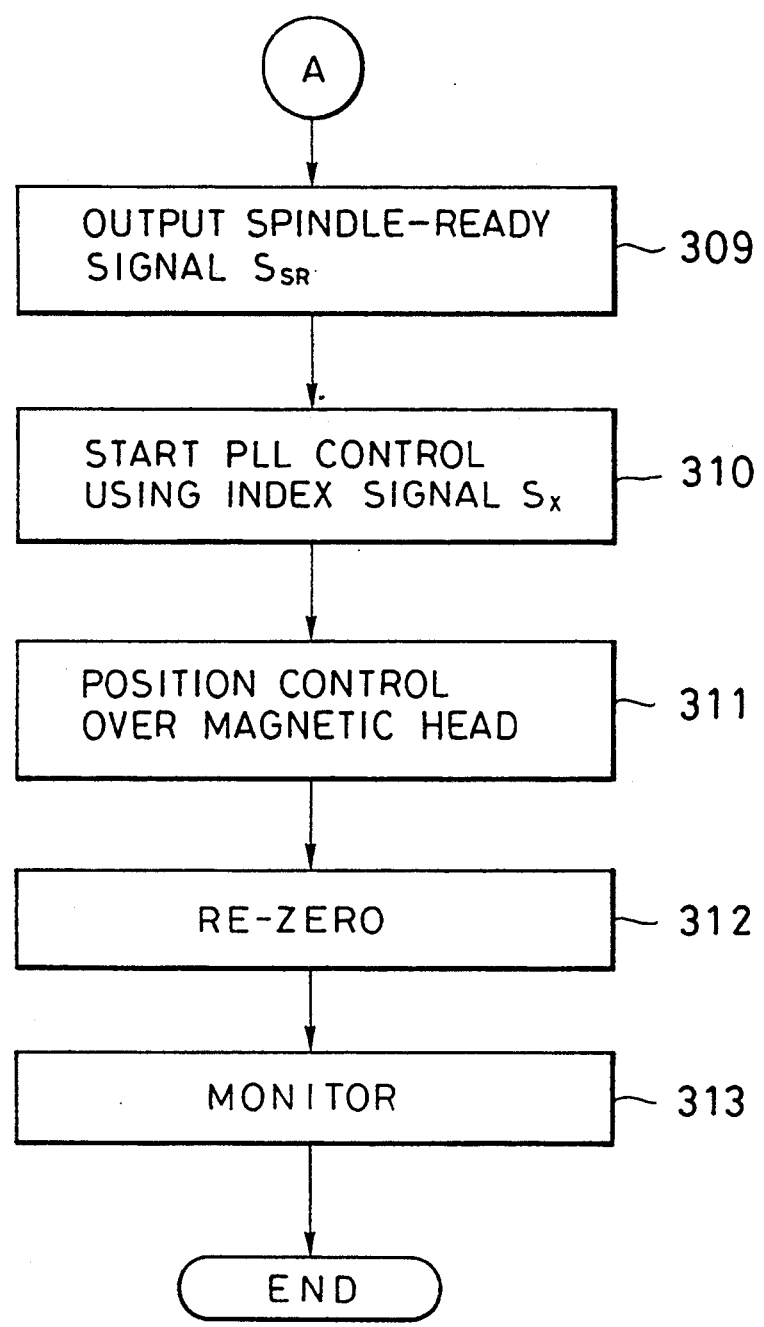

The operation of the embodiment will now be described. First, FIG. 10A and FIG. 10B are used for explaining the control operation of the control unit 119 at the Lime of starting the spindle motor.

When a DC power supply is connected to the magnetic disk drive device, the control unit 119 performs port set, system register set, and other initialization (301), and performs self-tests such as test on the internal ROM and the internal RAM (302). Then, it outputs the spindle motor start signal $S_{11}$ (303), and when the spindle motor driver 3 operates, the spindle motor 2 and the magnetic disk 1 fixed to it start rotating, and their speed gradually increases.

The control unit 119 detects the rotor position signal $S_T$ of the spindle motor 2 sent from the spindle motor driver 3. The position signal $S_T$ is formed, for example, from exciting voltages of various exciting windings and back electromotive force with reference to an end of the coils in the spindle motor 2.

The control unit 119 measures the signal $S_T$(304), and calculates the rotational speed from the period of the signal $S_T$. It further calculates the rotational speed error which is the difference between the measured speed and the target speed, and supplies the spindle motor driver 3 with a PWM (pulse width modulation) output which is a $S_{12}$ signal with its duty varied each time, so as to cause the spindle motor 2 to approach the predetermined speed.

The spindle motor driver 3 drives the spindle motor 2 with a duty ratio corresponding to the PWM signal supplied thereto. As a result, the spindle motor 2 increases its speed gradually and approaches the predetermined speed under the PWM control.

Whether the spindle motor 2 has reached the predetermined speed is judged by determining whether the period of the signal $S_T$ measured in the above-described manner is within the predetermined period (305).

After it has been Judged that the predetermined speed has been reached, the control unit 119 judges whether or not a first index signal generated by detecting the DC erase section 20 has been supplied from the servo timing circuit 118 (306).

It should be noted, in the first embodiment, the term "index signal" was used to refer to the signal which is generated by detecting the DC erase section, and, in the second embodiment, the term "first index signal" is used to refer to the same signal. This is to make a distinction from a second index signal obtained by reading the DC erase section in the servo sector.

When the first index signal has been detected, the control unit 119 measures the period of the signal $S_T$ (307), and Judgment is made as to whether or not the signal $S_T$ is within the predetermined period (308). After Judging that it is within the predetermined period and hence the predetermined speed has been reached, the control unit 119 supplies the servo timing circuit 118 with a spindle-ready signal indicating that the spindle motor 2 has reached the predetermined speed (309).

The control unit 119 waits for a second index signal $S_X$ supplied from the servo timing circuit 118 as described later. The second index signal $S_X$ supplied is a one-revolution signal and is obtained by detecting the gray code-detecting DC erase sections 82 in the servo sectors, and the control unit 119 receives the second index signal $S_X$, and performs a PLL (phase-locked loop) control for constant speed rotation of the spindle motor 2.

In this way, when the control unit 119 enters the spindle motor 2 into the PLL control, the access motor 14 is then driven, and control for correcting the position of the magnetic head 11 on the desired track is started (311).

The control unit 119 receives the servo burst 84 shown in FIG. 5, via the servo timing circuit 118. The servo burst 84 comprises a plurality of phases written in the radial direction symmetrically with respect to the track center and shifted with a predetermined pitch, with the signals produced from the multiple-phase servo burst 84 having timewise phases.

In the present example, when the magnetic head 11 deviates minutely from the track center, the analog values $S_A$ of the plurality of the servo burst 84 vary minutely corresponding to the position deviation. This variation is processed by the servo timing circuit 118, and the burst peak hold circuit 122 holds the peak of the output of the servo timing circuit 118, and performs analog-to-digital conversion. The digitized position signal $S_{BT}$ is input to the control unit 119.

The control unit 119 performs a servo calculation on the basis of the position information $S_{BT}$, supplies the access motor driver 15 with the result of the calculation as the rotation command value signal $S_{22}$, and performs a position correction control over the magnetic head with high speed thereby accurately positioning the magnetic head 11.

As will be described later, the position change control of the magnetic head 11 is normally conducted after the increment of the sector count value and before the next servo sectors appears. When the position changes is not completed within this time period, the position correction control is continued over a plurality of sectors.

The control unit 119 thereafter conducts re-zero (or re-calibration) operation (312). This is an operation for moving the magnetic head 11 toward the track #zero.

Having reached the track #zero, if no error is found in the device at that position, the state in which a command from a host device is awaited is commenced, and upon request from the host device, a monitor routine is started In which commands are decoded, and are executed.

The start-up control after the power-on of the device is completed in the manner described above. During the sequential control, the control unit 119 receives various signals supplied from the servo timing circuit 118, and supplies various signals to the servo timing circuit 118.

The control operation of the servo timing circuit 118 will now be described with reference to FIG. 11A to FIG. 11E.

When the device is not in operation, the magnetic head 11 is in the shipping area 9. At the time of power on, the magnetic head 11 is therefore in the shipping area 9, and is in contact with the magnetic disk 1, being slidable in the circumferential direction. As the speed of the disk increases, the magnetic head 11 floats from the magnetic disk 1.

In the present embodiment, before the magnetic disk 1 reaches the predetermined speed, the magnetic head 11 begins reading the data from the dedicated data area 7c in the shipping area 9 on the magnetic disk 1.

The dedicated data is data written with a constant frequency, and whether or not the magnetic disk 1 has reached the desired speed can be determined by reading the dedicated data, passing the dedicated data through the read/write circuit 16 and the pulse detector 17 to obtain read pulses $D_G$, and monitoring the period and the number of the read pulses $S_G$ by means of the servo timing circuit 118.

When the spindle motor 2 starts rotating, the magnetic head 11 begins reading data. Analog data $S_R$ amplified by the read/write circuit 16 is sent to the pulse detector 17. The pulse detector 17 converts the analog data $S_R$ into read pulses $D_G$ and sends them to the servo timing circuit 118.

The first processing in the servo timing circuit 118 is to confirm that it is in the state in which the spindle start signal $S_{11}$ is output from the control unit 119 (321). Upon this confirmation, the servo timing circuit 118 then detects the period of the read pulses $D_G$ (322). The read pulses $D_G$ are initially irregular being affected by noise, but as the speed increases the period of the read pulses $D_G$ becomes constant. When it is confirmed that the period of the read pulses $D_G$ enters within the predetermined time (323), and that this states is continued for a predetermined number of read pulses $D_G$ (324), the processing proceeds to a second stage.

In the second stage, DC erase section 20 which is necessary for generating the second index signal is sought. That is, the servo timing circuit 118 detects the DC erase section 20, while it detects the read pulses $D_G$ which are the results of reading the dedicated data written with a predetermined frequency and with a predetermined pattern (325).

The detection of the DC erase section 20 is achieved by detecting the state in which no read pulses $D_G$ are detected continues for a predetermined time (326). Then, whether or not it is in the spindle ready state is determined (327). Since in this state the control unit 119 is not detecting the first index signal (306) (FIG. 10A), It is not in the spindle ready state, so the timer for the first index signal is started (328) and when the timer becomes the predetermined value (329), the servo timing circuit 118 sends out a first index signal (330).

Then, the control proceeds again to the step 322 (FIG. 11A) of the first-stage, as illustrated.

The second index signal is produced once per revolution. It determines the start point of the track, and is used mainly For disk formatting.

In this embodiment, the DC erase section 20 in the data pattern written on the magnetic disk 1 is detected to generate a first index signal by means of the servo timing circuit 118.

Figure 11B:
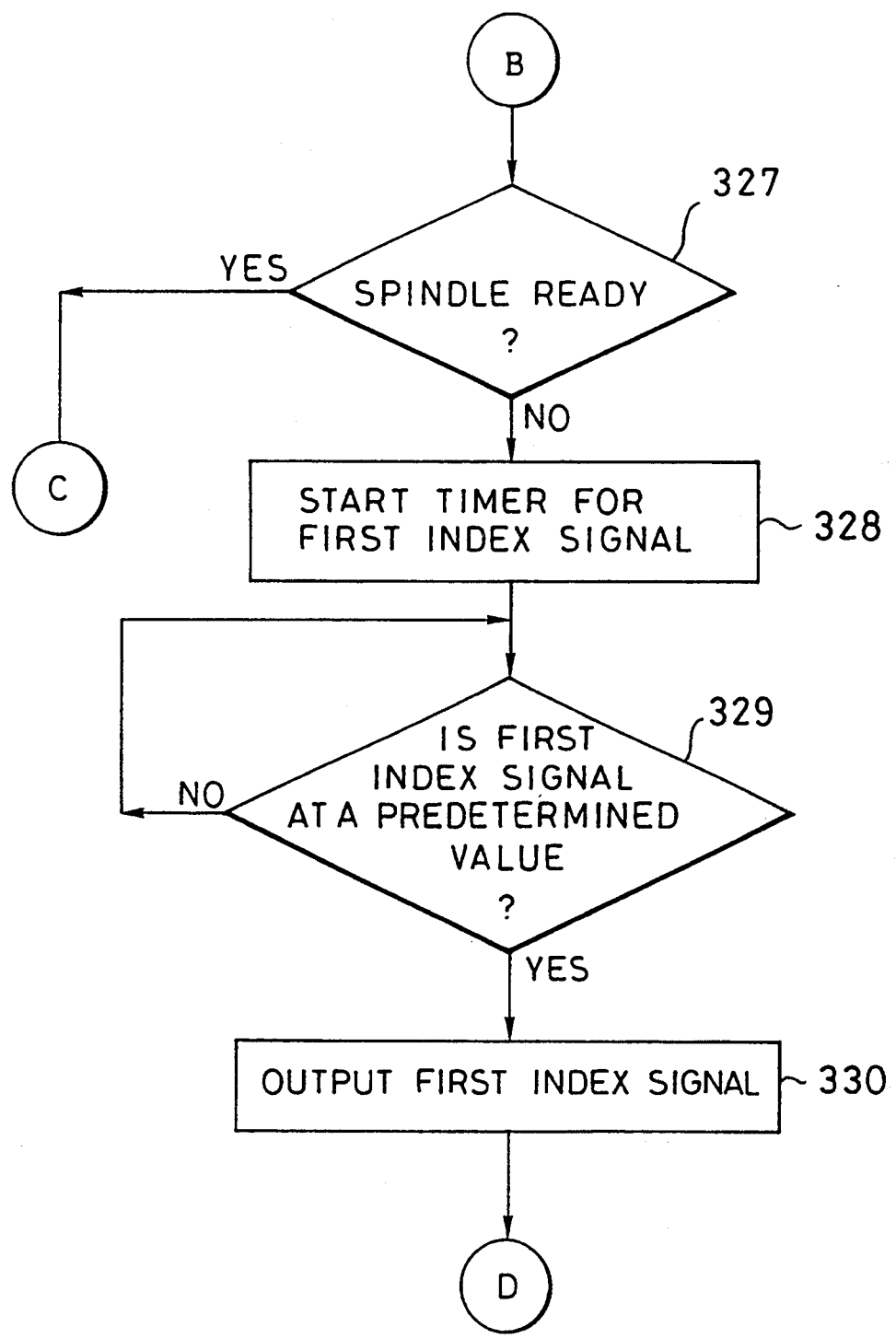
Figure 11C:
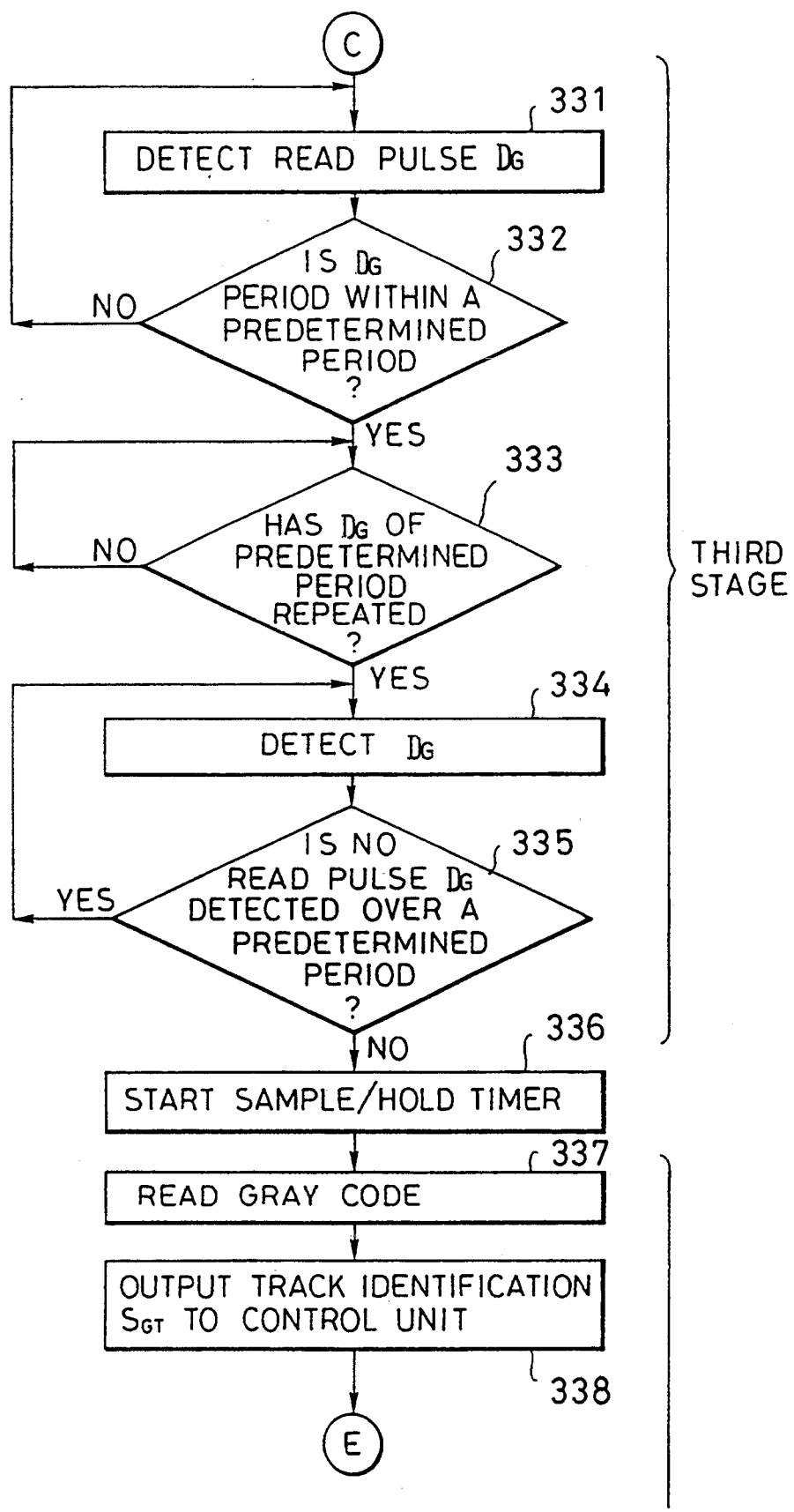
Figure 11D:
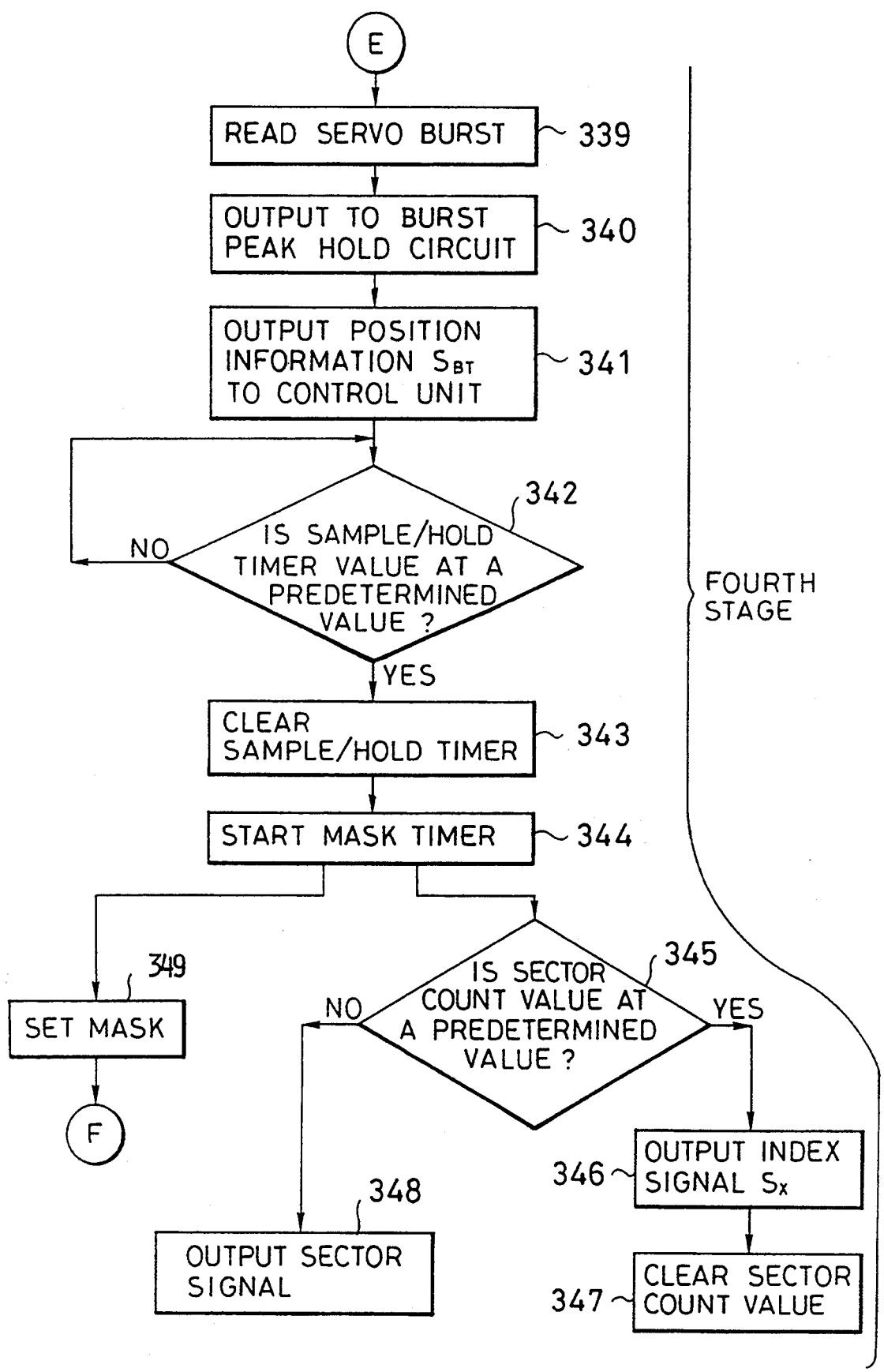
Figure 11E:
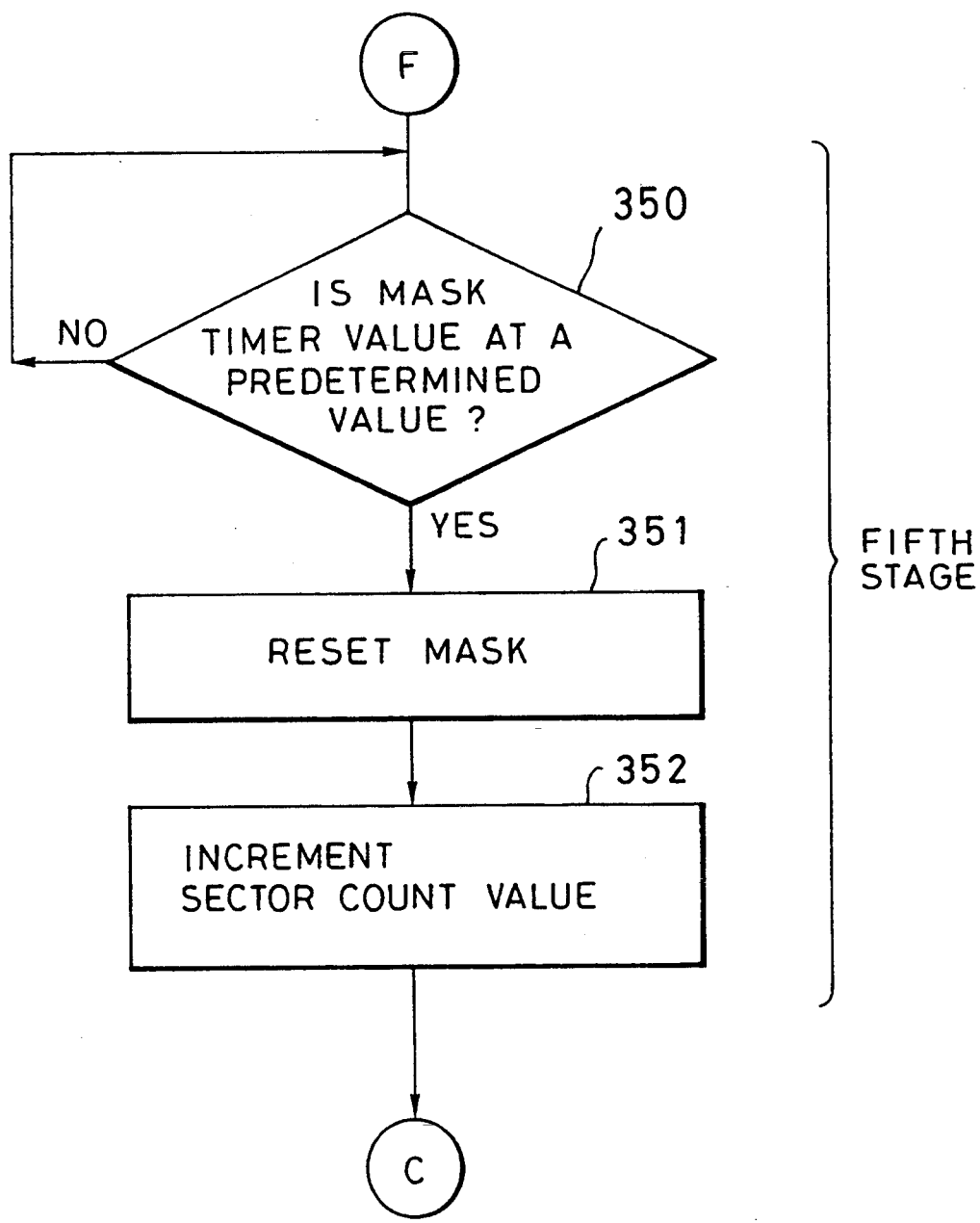

After the control unit 119 detects the first index signal (306) generated by the servo timing circuit 118, it sends out the spindle ready signal $S_{SR}$ indicating that the spindle motor 2 is ill the constant-speed rotation state (306). As a result, the servo timing circuit 118 judges in the stage that it is in the spindle ready state in the second step (327), and moves out of the step for generating the first index signal in the second stage, and jumps to a third stage (FIG. 11C).

The third stage and subsequent stages are for the signal processing and control at the servo section. As will be seen from FIG. 3 and FIG. 5, the magnetic head 11 enters the servo sector 8 after the DC erase section 20. In the servo sector, the magnetic head 11 detects the sync area 81 which precedes the next data sector 7. The sync area 81 is also written with a predetermined frequency, and in this third stage, regular read pulses $D_G$ are detected (331).

It is then confirmed that the period of the read pulses $D_G$ is within the predetermined time (332), and that the read pulses with their period within the predetermined time have consecutively appeared (333). Next, for detection of the erase section 82, presence or absence of the read pulses $S_G$ is again detected (334), and when it is confirmed that the state in which no read pulses $D_G$ appear (335) continues for a predetermined time (335), the sample/hold timer is started (336). This timer is used for the time reference for various signal processing.

In the fourth stage (FIGS. 11C and 11D), the gray code 83 is read (337), and on the basis of the track identification information $S_{GT}$ obtained by reading the gray code and supplied from the servo timing circuit 118 (338), the control unit 119 determines on which track of the magnetic disk the magnetic head 11 is positioned.

After reading the gray code 83, the servo burst 84 is read.

The servo burst is a signal comprising a plurality of phases written symmetrically with respect to the track center and being shifted at a predetermined pitch, and with the plurality of phases having time-wise phases.

When the magnetic head 11 is deviated a little from the track center, this is promptly corrected by the position correction operation. For this position correction, the result of reading the servo burst 84 is processed by the servo timing circuit 118. The result of the processing is sent to the burst peak hold circuit 122 (340), where the servo burst analog signal $S_A$ is processed and analog-to-digital converted, and sent, as a position information $S_{BT}$, to the control unit 119 (341). On the basis of the position information $S_{BT}$, the control unit 119 performs a servo operation, and supplies the access motor driver 15 with the results of calculation as the rotation command value signal $S_{22}$ for the access motor 14. With such a control the position of the magnetic head 11 is corrected at a high speed.

Whether or not the sample/hold timer value has reached a predetermined value is then checked (342). When the predetermined value has been reached, the sample/hold timer is cleared (343). At this time point, the magnetic head 11 is in the sync area 85 preceding the data sector 7 shown in FIG. 5, and the series of processing at the servo sector 8 preceding the data sector 7 is completed.

The mask timer is then started (344), and whether or not the sector count value is at a predetermined number is checked (345). If it is at the predetermined number, a second index signal $S_X$ is supplied to the control unit 119 (346), and the sector count value is cleared (347). If the predetermined value has not been reached, a sector signal $S_{SE}$ is supplied to the control unit 119 (348).

After starting the mask timer (344), and until the servo sector 8 preceding the next data sector is reached, the mask is kept in the set state (349). By setting tire mask, detection of the dedicated data section in the shipping area is disabled.

Whether or not the mask timer value has reached a predetermined value is then checked (350). When the predetermined value has been reached, the magnetic head 11 has entered the sync area 81 of the servo sector preceding the next data sector 7. The servo timing circuit 118 then resets the mask (351), and increments the sector count value (352). The signal processing and control is then transferred to the third stage.

In the stage before the next servo sector 8 appears, the control unit 119 enters the control for correcting the position of the magnetic head 11 on the track. This normally is completed before the next servo sector 8 appears, but if this position correction is not completed before the next servo sector appears, the position correction control is continued over a plurality of data sectors 7.

As has been described, the start-up control after the power-on of the device proceeds in succession, and is completed, through exchange of various signals between the control unit 119 and the servo timing circuit 118.

As has been described, according to the second embodiment of the present embodiment, the servo systems for the spindle motor rotation and the magnetic head positioning, is configured of the control unit comprising essentially a programmed one-chip microcomputer, and the dedicated servo timing circuit, so that the amount of control circuitry can be reduced and simplified, and the flexibility and versatility of the system improved by virtue of the use of software.

Moreover, the size and cost of the device is reduced, and the accessing speed and reliability improved.

Furthermore, it is no longer necessary to provide a circuit for generating a one-revolution signal in the spindle motor, so the cost of the device is lowered and the reliability increased.

In addition, the control for positioning the magnetic head can be made on the basis of the dedicated data and the servo information which are written in advance, the access motor need not be provided with an optical encoder or other signal generating unit, nor with a driver circuit therefor, so the cost of the device is lowered and the reliability of the device is improved.

Furthermore, the use of the servo timing circuit for the control for the spindle motor at the time of its start reduces the task of the microcomputer in the control unit.

What is claimed is:

1. A magnetic disk drive device comprising:
    a magnetic disk having a data surface thereon and a plurality of concentric tracks on said data surface on which to read and write data, said concentric tracks being divided by a plurality of boundary lines extending radially from a center of said disk into a plurality of data sectors and servo sectors, at least one of the concentric tracks being a shipping area and the other tracks being a data area, the shipping area having dedicated data including a dedicated data area written in each of the plurality of data sectors and an indexing DC erase signal in one of the dedicated data areas of said shipping area, said dedicated data being different from data in said data area;
    a spindle motor for rotatably supporting said magnetic disk;
    a magnetic head for reading data from and writing data to said data surface as said magnetic disk is rotated by said spindle motor; and
    a control unit electrically connected to said magnetic head for detecting the dedicated data in said dedicated data areas and the DC erase signal when rotation of the magnetic disk is started, and measuring a speed of the magnetic disk based on the dedicated data and the DC erase signal in said one of the dedicated data areas thereby determining when the speed of said magnetic disc reaches a predetermined value.

2. The device of claim 1, wherein said dedicated data is of a constant frequency.

3. The device of claim 1, wherein the shipping area is formed at least one of an outermost track and an innermost track.

4. The device of claim 1, wherein said control unit determines when the magnetic head is located in the shipping area based on a detection of the indexing DC erase signal and the dedicated data by the magnetic head.

5. The device of claim 1, wherein said control unit determines, on the basis of detection of said dedicated data, that said disk has reached a speed near the predetermined speed, and, by detecting said indexing DC erase signal, said disk has reached said predetermined speed.

6. The device of claim 5, further comprising a servo timing circuit for supplying said control unit with an index signal generated once every revolution of the disk on the basis of a signal obtained by detecting the indexing DC erase signal by means of said magnetic head.

7. The device of claim 6, wherein said control unit sets a data sector immediately following the index signal output from the servo timing circuit as a first data sector.

8. The device of claim 6, wherein, after the control unit determines that the disk has reached the predetermined speed on the basis of the period of generation of the index signal, the control unit masks the output from the servo timing circuit so as to prevent detection of the data from said servo sector.

9. The device of claim 1, wherein said disk further comprises a gray code which is a track identification information written for each sector of each track of the disk.

10. The device of claim 9, wherein said disk further comprises a gray code-detecting DC erase section immediately before the gray code in the servo sector, and
said control unit detects the data immediately following the gray code-detecting DC erase section as the gray code.

11. The device of claim 10, wherein the gray code-detecting DC erase section is shorter in length than the indexing DC erase section.

12. The device of claim 10, wherein said control unit masks the output from the servo timing circuit to disable detection of the data from the data sector after detecting the gray code-detecting DC erase section.

13. The device of claim 10, wherein, on the basis of the information in the gray code, the magnetic head, which is on the shipping area, is set to an initial track, after said control means determines that the disk has reached the predetermined speed.

14. The device of claim 10, further comprising servo burst data disposed within the respective servo sectors and comprised of data written at a position shifted by a predetermined distance readily outward from a track center position and data written at a position shifted by a predetermined distance radially inward from the track center position;
wherein said control unit performs a position correction operation for directing the magnetic head toward the track center position on the basis of the servo burst signal obtained by reading the servo burst data by means of the magnetic head.

15. A magnetic disk drive device comprising:
a magnetic disk having servo sectors containing servo information and data sectors containing data, said sectors being disposed alternately in the circumferential direction, having a shipping area in which dedicated data is pre-recorded at portions corresponding to the data sectors, and having an indexing DC erase section disposed at a portion corresponding to a data sector for generating a first index signal;
a spindle motor for rotatably supporting the magnetic disk;
a control means connected to the spindle motor for controlling start of said spindle motor and performing constant-speed control over the magnetic disk;
a magnetic head for reading the dedicated data and data on the magnetic disk; and
a servo timing circuit connected to said magnetic head for confirming that the magnetic disk is rotating at a constant speed on the basis of the dedicated data read by the magnetic head, and sending a first index signal to the control means;
wherein said control means sends, after receiving the first index signal, a magnetic disk rotation-ready signal to said servo timing circuit and sets the data sector that is detected first after detection of the indexing DC erase signal, as a first data sector; and
said servo timing circuit sends the sector signal generated first after receiving the rotation-ready signal on the basis of the servo information read by the magnetic head, as a second index signal to the control means, and masks the portion within the shipping area corresponding to the data sector.

16. The device of claim 15, wherein the shipping area is formed at an inner periphery or outer periphery of the magnetic disk.

17. The device of claim 15, wherein said dedicated data is written with a constant frequency in the portion corresponding to the data sector.

18. The device of claim 15, wherein said control means measuring the period of the second index signal from the servo timing circuit, after sending said rotation-ready signal, and performs Phase-locked loop control for constant speed rotation of the spindle motor.

19. The device of claim 15, wherein said servo timing circuit masks the portion within the shipping area corresponding to the data sector after receiving the rotation-ready signal, and terminates the masking of the servo sector portion.

* * * * *